(12) United States Patent
Mizuno et al.

(10) Patent No.: US 10,556,500 B2
(45) Date of Patent: Feb. 11, 2020

(54) WORK VEHICLE

(71) Applicant: KOMATSU LTD., Tokyo (JP)

(72) Inventors: Hiroyuki Mizuno, Uji (JP); Satoru Ide, Ibaraki (JP); Syuhei Takarae, Hirakata (JP)

(73) Assignee: KOMATSU LTD., Tokyo (JP)

( * ) Notice: Subject to any disclaimer, the term of this patent is extended or adjusted under 35 U.S.C. 154(b) by 178 days.

(21) Appl. No.: 15/124,760

(22) PCT Filed: May 24, 2016

(86) PCT No.: PCT/JP2016/065258
§ 371 (c)(1),
(2) Date: Sep. 9, 2016

(87) PCT Pub. No.: WO2017/203588
PCT Pub. Date: Nov. 30, 2017

(65) Prior Publication Data
US 2018/0162216 A1 Jun. 14, 2018

(51) Int. Cl.
*B60K 11/04* (2006.01)
*B60K 11/08* (2006.01)
(Continued)

(52) U.S. Cl.
CPC .............. *B60K 11/04* (2013.01); *B60K 11/06* (2013.01); *B60K 11/08* (2013.01); *B60K 13/04* (2013.01);
(Continued)

(58) Field of Classification Search
CPC ......... B60K 11/04; B60K 11/06; B60K 11/08; B60K 13/04; B60Y 2200/412; B60Y 2306/05; E02F 9/0866; F01N 2260/022
See application file for complete search history.

(56) References Cited

U.S. PATENT DOCUMENTS 2,841,232 A * 7/1958 Loeffler ................. B60K 13/04
180/89.2
6,832,872 B2 * 12/2004 Koelm .................... B08B 15/02
404/108
(Continued)

FOREIGN PATENT DOCUMENTS

CN 103826896 A 5/2014
JP 8-197964 A 8/1996
(Continued)

OTHER PUBLICATIONS

The Office Action for the corresponding Chinese application No. 201680000827.X, dated Jul. 30, 2019.

*Primary Examiner* — James A Shriver, II
*Assistant Examiner* — Steve Clemmons
(74) *Attorney, Agent, or Firm* — Global IP Counselors, LLP (57) ABSTRACT

A hydraulic excavator includes an engine hood covering an engine from above and a vent member disposed inside the engine hood. The engine hood includes a third side plate. The third side plate is provided with a lower side vent hole group, and simultaneously, a region located laterally to the lower side vent hole group is imperforate. The vent member covers the lower side vent hole group with a first opening from inside. A second opening of the vent member communicates with an interior of the engine hood. The vent member upwardly tilts toward the engine hood.

5 Claims, 6 Drawing Sheets

(51) Int. Cl.
*E02F 9/08* (2006.01)
*B60K 11/06* (2006.01)
*B60K 13/04* (2006.01)

(52) U.S. Cl.
CPC .......... *E02F 9/0866* (2013.01); *E02F 9/0891* (2013.01); *B60Y 2200/412* (2013.01); *B60Y 2306/05* (2013.01)

(56) References Cited

U.S. PATENT DOCUMENTS

| | | | | |
|---|---|---|---|---|
| 6,962,230 | B2* | 11/2005 | Hanaya | B60K 13/04 180/309 |
| 7,207,172 | B2* | 4/2007 | Willix | B62D 25/10 60/274 |
| 7,891,452 | B2* | 2/2011 | Iwamoto | F01N 13/20 180/225 |
| 8,286,422 | B2* | 10/2012 | Yang | F01N 1/14 60/298 |
| 8,919,469 | B2* | 12/2014 | Shatters | B60K 11/00 180/68.1 |
| 8,919,486 | B2* | 12/2014 | Nakagami | E02F 9/0866 180/309 |
| 9,523,182 | B2* | 12/2016 | Yabe | B60K 11/04 |
| 2002/0017408 | A1* | 2/2002 | Oshikawa | B60K 11/08 180/69.2 |
| 2003/0066209 | A1* | 4/2003 | Takezaki | B60K 11/08 37/197 |
| 2013/0074410 | A1 | 3/2013 | Berkeland | |
| 2013/0302720 | A1* | 11/2013 | Ozawa | B60K 1/04 429/513 |
| 2014/0238767 | A1* | 8/2014 | Numa | F01N 3/2066 180/309 |
| 2015/0184361 | A1* | 7/2015 | Imano | E02F 9/0866 180/309 |
| 2016/0068058 | A1 | 3/2016 | Kamimae et al. | |
| 2016/0160726 | A1* | 6/2016 | Imano | B60K 11/06 60/276 |

FOREIGN PATENT DOCUMENTS

| | | | | |
|---|---|---|---|---|
| JP | 10-338036 A | | 12/1998 | |
| JP | 2002264666 A | * | 9/2002 | |
| JP | 2004-352089 A | | 12/2004 | |
| JP | 2011012446 A | * | 1/2011 | |
| JP | 5329009 B1 | * | 10/2013 | ........... F01N 3/2066 |
| WO | WO-2014192404 A1 | * | 12/2014 | ............ B60K 11/04 |
| WO | 2015079764 A1 | | 6/2015 | |

* cited by examiner

FIG. 6

WORK VEHICLE

CROSS-REFERENCE TO RELATED APPLICATIONS

This application is a U.S. National stage application of International Application No. PCT/JP2016/065258, filed on May 24, 2016.

BACKGROUND

Field of the Invention

The present invention relates to a work vehicle.

Background Information

Work vehicles have so far had a construction that an engine cover for enclosing an engine is provided with a plurality of vent holes in its side plates so as to take outdoor air into its interior. International Patent Application Publication No. WO2015/079764 proposes a construction that a ventilation member is disposed inside of part of the plurality of vent holes provided in the engine cover so as to feed outdoor air to a predetermined position located in the interior of the engine cover.

SUMMARY

However, the engine cover described in International Patent Application Publication No. WO2015/079764 has had a drawback that the ventilation member hinders the air inside the engine cover from being efficiently released to the outside after the engine is stopped.

The present invention has been produced in view of the aforementioned situation. It is an object of the present invention to provide a work vehicle in which the interior of an engine cover can be efficiently cooled after an engine is stopped.

A work vehicle according to a first aspect of the present invention includes an engine, an engine cover enclosing the engine, and a vent member disposed inside the engine cover. The engine cover includes a side plate provided with at least one vent hole. A region located laterally to the at least one vent hole in the side plate is imperforate. The vent member includes a first opening continuing to the at least one vent hole and a second opening communicating with an interior of the engine cover. The vent member upwardly tilts toward the engine cover.

In the work vehicle according to the first aspect of the present invention, any other vent hole is not provided in the region located laterally to the vent hole provided in the side plate. With the construction, elevation in temperature of outdoor air can be inhibited in the surroundings of the vent hole. Hence, a difference in temperature between the first and second openings of the vent member can be enlarged. Therefore, airflow directed from the second opening to the first opening within the vent member can be generated. Due to this, high temperature air inside the engine cover can be released to the outside through the vent hole via the vent member. As a result, the interior of the engine cover can be efficiently cooled even after the engine is stopped.

A work vehicle according to a second aspect of the present invention relates to the work vehicle according to the first aspect, and wherein a region located below the at least one vent hole in the side plate is imperforate.

In the work vehicle according to the second aspect of the present invention, elevation in temperature of outdoor air can be more inhibited in the surroundings of the vent hole. Hence, the rate of airflow directed from the second opening to the first opening within the vent member can be increased. As a result, the interior of the engine cover can be more efficiently cooled.

A work vehicle according to a third aspect of the present invention relates to the work vehicle according to the first or second aspect, and further includes an exhaust gas aftertreatment unit disposed inside the engine cover. The second opening opens toward the exhaust gas aftertreatment unit.

In the work vehicle according to the third aspect of the present invention, it is possible to exclusively cool the exhaust gas aftertreatment unit that the temperature thereof is especially likely to become high due to radiant heat of the engine and high temperature exhaust gas residing in the interior after the engine is stopped.

A work vehicle according to a fourth aspect of the present invention relates to the work vehicle according to any of the first to third aspects, and wherein the vent member includes the enclosure provided with the first opening and the tube provided with the second opening. The tube is attached to the enclosure.

In the work vehicle according to the fourth aspect of the present invention, spot cooling is enabled for a desired region in the interior of the engine cover by suitably changing the length and position of the tube.

According to the present invention, it is possible to provide a work vehicle in which the interior of an engine cover can be efficiently cooled after an engine is stopped.

DESCRIPTION OF EXEMPLARY EMBODIMENTS

Figure 1:
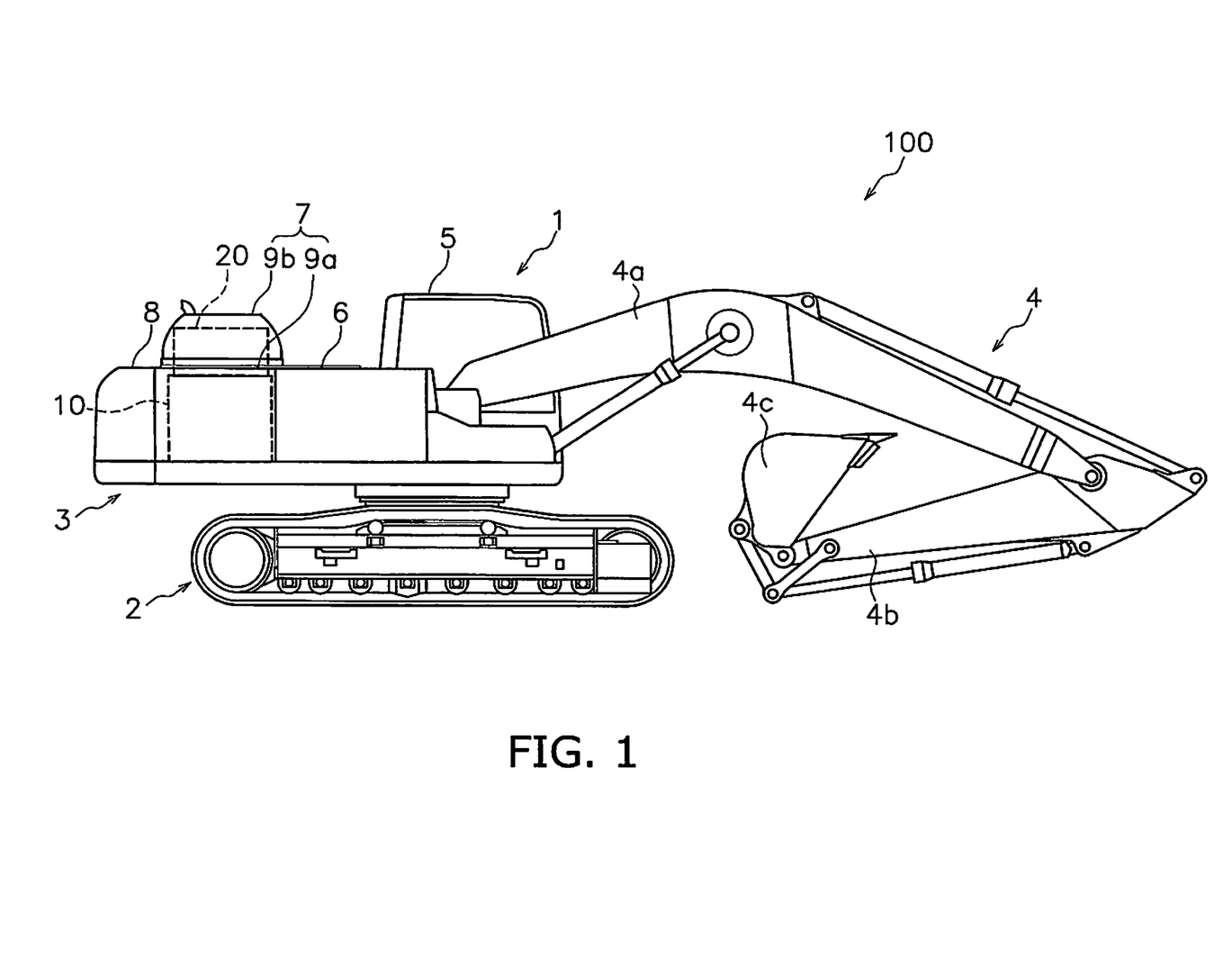
FIG. 1 is a side view of a hydraulic excavator.

Construction of Hydraulic Excavator 100
FIG. 1 is a side view of a hydraulic excavator 100. In the following description, "front", "rear", "left" and "right" indicate directions based on a front view seen from an operator seat. "Vehicle width direction" is synonymous with "right-and-left direction".

The hydraulic excavator 100 is an exemplary work vehicle according to the present exemplary embodiment. The hydraulic excavator 100 includes a vehicle body 1 and a work implement 4.

The vehicle body 1 includes a drive unit 2 and a revolving unit 3. The drive unit 2 is configured to be driven by a power of an engine 10. The revolving unit 3 is disposed on the drive unit 2. The revolving unit 3 is capable of revolving relatively to the drive unit 2.

The revolving unit 3 includes a cab 5, a machine compartment cover 6, an engine cover 7 and a counterweight 8. The cab 5 is disposed on the left of the base end of the work implement 4. The machine compartment cover 6 is disposed rearward of the cab 5. A machine compartment is produced in the interior of the machine compartment cover 6. The machine compartment accommodates a fuel tank, a hydraulic oil tank and so forth.

The engine cover 7 is connected to the rear side of the machine compartment cover 6. An engine compartment is produced in the interior of the engine cover 7. The engine compartment accommodates the engine 10, an exhaust gas aftertreatment unit 20 and so forth. The engine cover 7 encloses the engine 10 and the exhaust gas aftertreatment unit 20. The engine cover 7 includes a lateral cover 9a and an engine hood 9b. The lateral cover 9a encloses the engine 10 from lateral sides. The engine hood 9b is disposed on the lateral cover 9a. The engine hood 9b is capable of taking an opened/closed position while being attached to the lateral cover 9a.

The engine hood 9b covers the engine 10 and the exhaust gas aftertreatment unit 20 from above. The exhaust gas aftertreatment unit 20 is disposed inside the engine hood 9b. The exhaust gas aftertreatment unit 20 is disposed above the engine 10. The counterweight 8 is disposed rearward of the engine cover 7.

The work implement 4 is attached to the front part of the revolving unit 3. The work implement 4 includes a boom 4a, an arm 4b and a bucket 4c. The work implement 4 is configured to be driven by hydraulic oil supplied thereto.

Internal Construction of Engine Hood 9b

Figure 2:
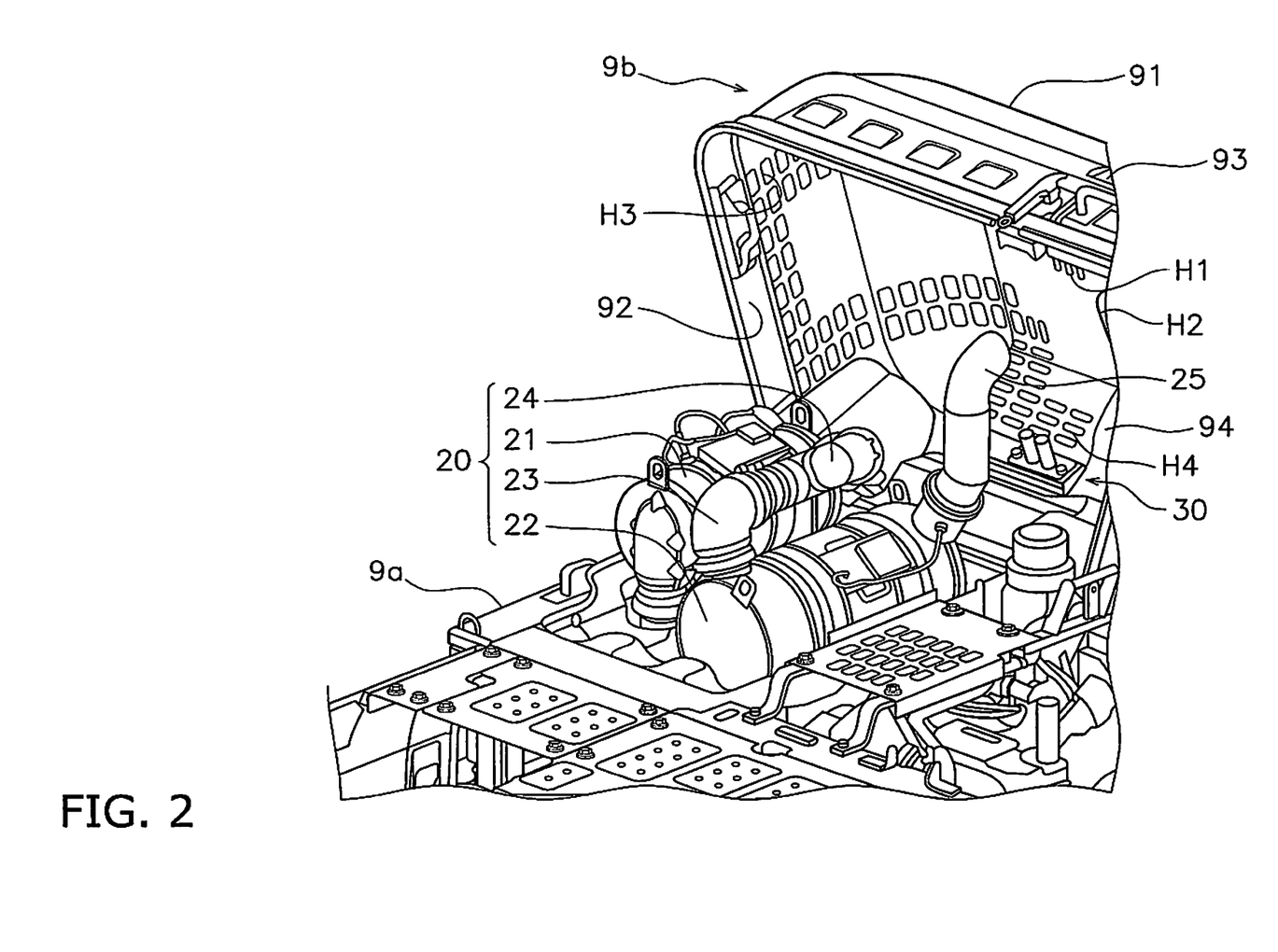
FIG. 2 is a front perspective diagram for explaining an internal construction of an engine hood.
Figure 3:
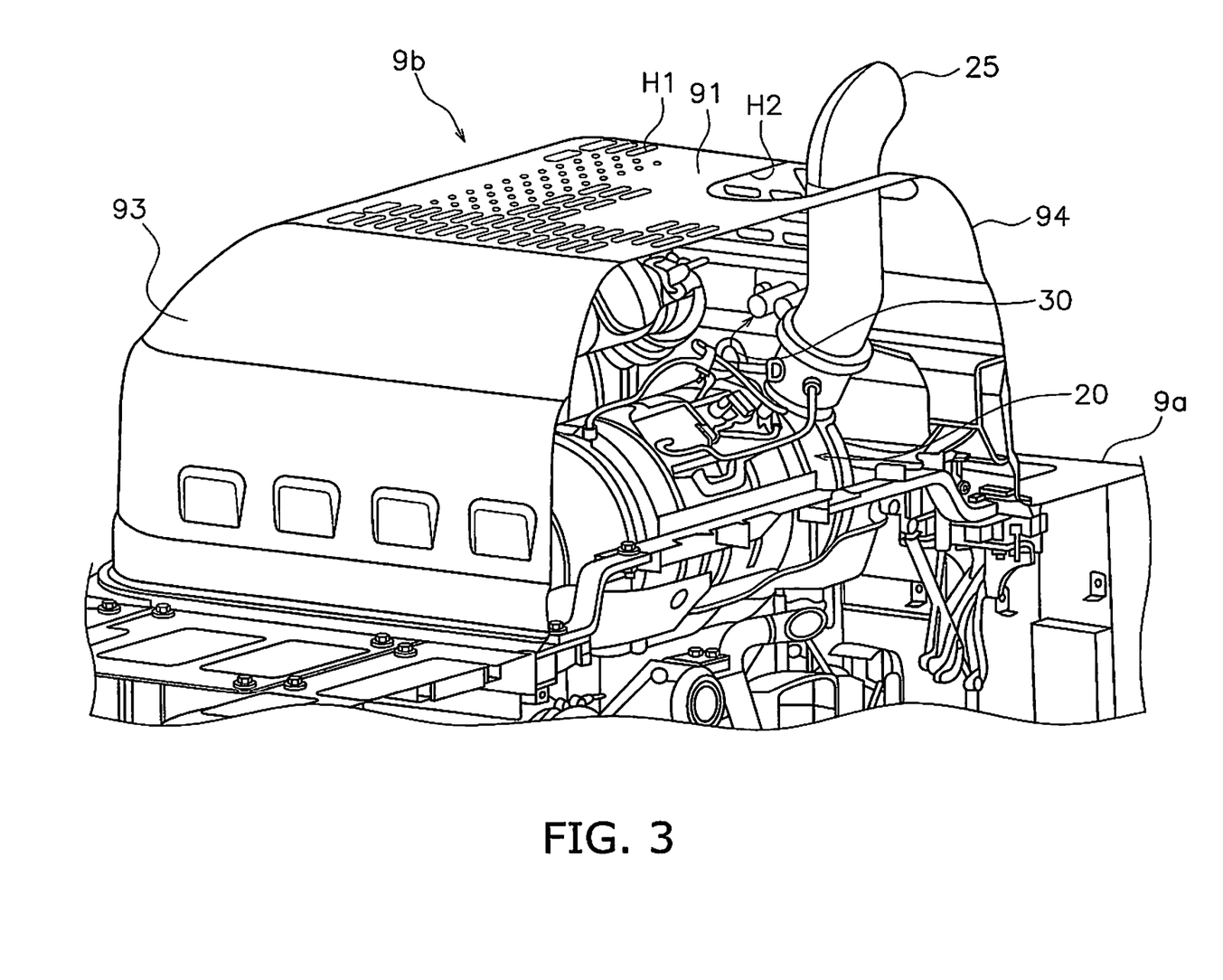
FIG. 3 is a front perspective and cross-sectional diagram for explaining the internal construction of the engine hood.
Figure 4:
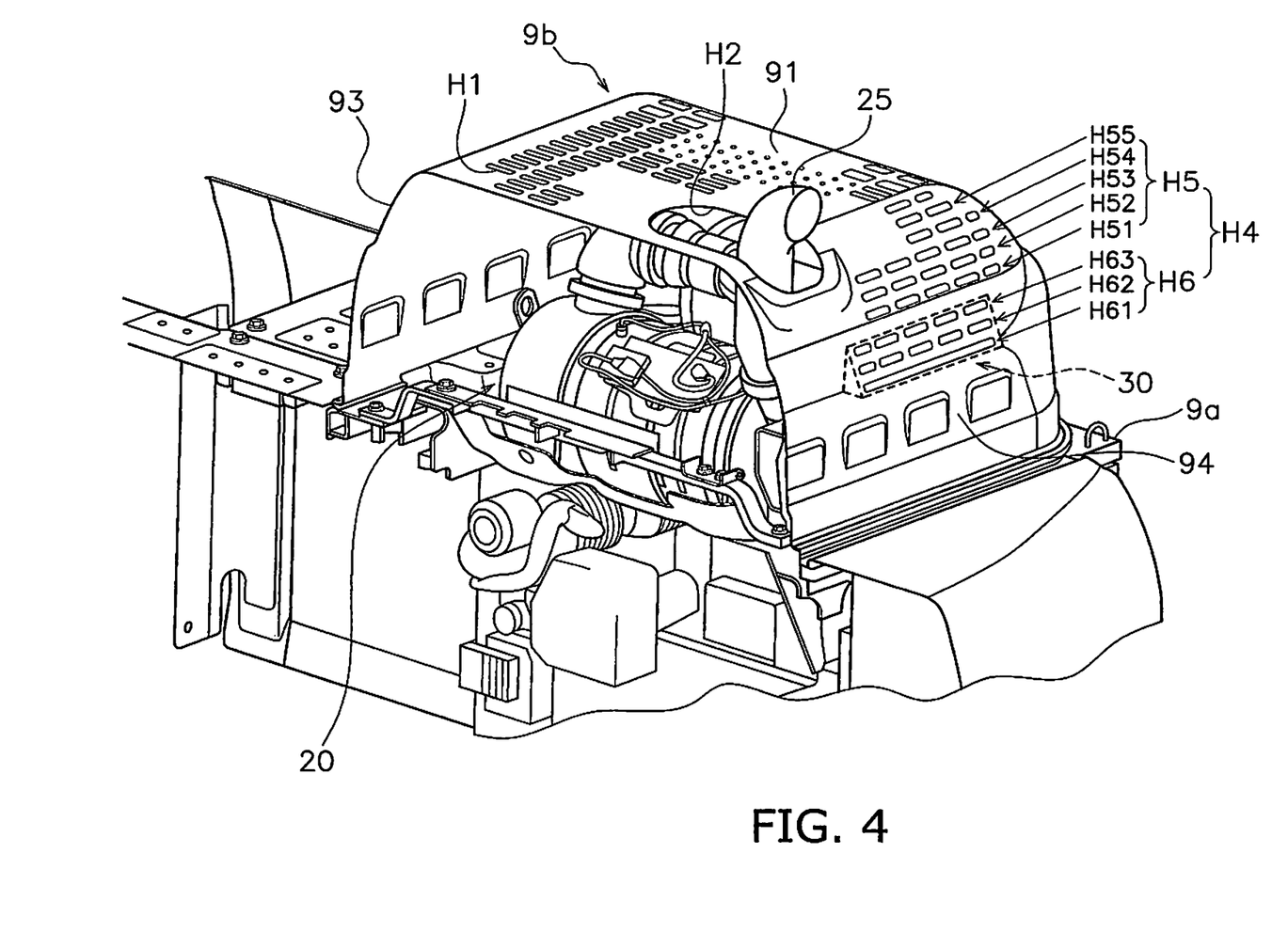
FIG. 4 is a rear perspective and cross-sectional diagram for explaining the internal construction of the engine hood.

FIG. 2 is a front perspective diagram for explaining an internal construction of the engine hood 9b. FIG. 3 is a front perspective and cross-sectional diagram for explaining the internal construction of the engine hood 9b. FIG. 4 is a rear perspective and cross-sectional diagram for explaining the internal construction of the engine hood 9b. FIG. 2 shows that the engine hood 9b in an opened position, whereas FIGS. 3 and 4 show that the engine hood 9b in a closed position.

The exhaust gas aftertreatment unit 20 is accommodated inside the engine hood 9b. The exhaust gas aftertreatment unit 20 includes a diesel particulate filter device 21, a selective catalytic reduction device 22, a connecting pipe 23 and a reducing agent injection device 24.

The diesel particulate filter device 21 is configured to trap particulate materials contained in an exhaust gas from the engine 10 (see FIG. 1) by a filter. In the present exemplary embodiment, the diesel particulate filter device 21 has a substantially cylindrical contour. The diesel particulate filter device 21 is disposed along the back-and-forth direction.

The selective catalytic reduction device 22 is disposed downstream of the diesel particulate filter device 21. After passing through the diesel particulate filter device 21, the exhaust gas is introduced into the selective catalytic reduction device 22. The selective catalytic reduction device 22 is configured to reduce nitrogen oxides contained in the exhaust gas by ammonia. In the present exemplary embodiment, the selective catalytic reduction device 22 has a substantially cylindrical contour. The selective catalytic reduction device 22 is disposed along the back-and-forth direction. An exhaust pipe 25 protruding from the engine hood 9b is connected to the rear end of the selective catalytic reduction device 22. After experiencing treatment by the exhaust gas aftertreatment unit 20, the exhaust gas is released to the outside through the exhaust pipe 25.

The connecting pipe 23 connects the diesel particulate filter device 21 and the selective catalytic reduction device 22 therethrough. In the present exemplary embodiment, the connecting pipe 23 is connected to the rear end of the diesel particulate filter device 21 and the front end of the selective catalytic reduction device 22.

The reducing agent injection device 24 is attached to the connecting pipe 23. A reducing agent supply pipe 27 is connected to the reducing agent injection device 24. The reducing agent supply pipe 27 supplies urea aqueous solution, which is fed thereto from an urea aqueous solution tank (not shown in the drawings), to the reducing agent injection device 24. The reducing agent injection device 24 is configured to inject the urea aqueous solution into the exhaust gas flowing inside the connecting pipe 23. The urea aqueous solution injected from the reducing agent injection device 24 is hydrolyzed by the heat of the exhaust gas and is changed into ammonia. The ammonia produced inside the connecting pipe 23 is introduced together with the exhaust gas into the selective catalytic reduction device 22.

During driving of the engine 10 and after stopping of the engine 10, the diesel particulate filter device 21, the selective catalytic reduction device 22 and the reducing agent injection device 24 are heated to high temperature by radiant heat of the engine 10 and the exhaust gas residing at high temperature inside these devices.

The engine hood 9b includes a top plate 91 and four side plates (FIGS. 2 to 4 show only a first side plate 92, a second side plate 93 and a third side plate 94).

The top plate 91 is disposed above the exhaust gas aftertreatment unit 20. The top plate 91 is made in a planar surface shape. The top plate 91 is provided with a plurality of vent holes H1 and an exhaust pipe insertion through hole H2. The plural vent holes H1 include variously shaped vent holes, such as rounded rectangular vent holes and circular vent holes. During driving of the engine 10 and after stopping of the engine 10, air inside the engine hood 9b is released to the outside through the respective vent holes H1. The positions, shapes and number of the respective vent holes H1 can be suitably changed. When the engine hood 9b takes the closed position, the exhaust pipe 25 is configured to be inserted through the exhaust pipe insertion through hole H2.

The first side plate 92 extends downward from the right end of the top plate 91. The upper half of the first side plate 92 is made in a curved surface shape, whereas the lower half thereof is made in a planar surface shape. The first side plate 92 is the right plate of the engine hood 9b. The first side plate 92 continues to the second side plate 93 and the third side plate 94. As shown in FIG. 2, the first side plate 92 is provided with a plurality of vent holes H3. During driving of the engine 10 and after stopping of the engine 10, the air inside the engine hood 9b is released to the outside through the respective vent holes H3. The positions, shapes and number of the respective vent holes H3 can be suitably changed.

The second side plate 93 extends downward from the front end of the top plate 91. The upper half of the second side plate 93 is made in a curved surface shape, whereas the lower half thereof is made in a planar surface shape. The second side plate 93 is the front plate of the engine hood 9b. The second side plate 93 faces the third side plate 94 through the top plate 91. The second side plate 93 has the same contour as the third side plate 94. It should be noted that in the present exemplary embodiment, the second side plate 93 is not provided with any vent holes.

The third side plate 94 extends downward from the rear end of the top plate 91. The upper half of the third side plate 94 is made in a curved surface shape, whereas the lower half thereof is made in a planar surface shape. The third side plate 94 is the rear plate of the engine hood 9b. The third side plate 94 is provided with a plurality of vent holes H4. As shown in FIG. 4, the plural vent holes H4 include an upper side vent hole group H5 and a lower side vent hole group H6. In the present exemplary embodiment, the third side plate 94 is an exemplary side plate of the engine cover 7.

The upper side vent hole group H5 is provided on the upper half of the third side plate 94 that is made in a curved surface shape. The upper side vent hole group H5 includes five first vent holes H51, five second vent holes H52, five third vent holes H53, two fourth vent holes H54 and two fifth vent holes H55.

The five first vent holes H51 are provided in the bottom row of the upper side vent hole group H5. The five first vent holes H51 are provided above the lower side vent hole group H6. The five first vent holes H51 are provided at equal intervals in the vehicle width direction. The five second vent holes H52, the five third vent holes H53, the two fourth vent holes H54 and the two fifth vent holes H55 are provided above the five first vent holes H51 in this sequential order from bottom to top. During driving of the engine 10 and after stopping of the engine 10, the air inside the engine hood 9b is released to the outside through the upper side vent hole group H5. The positions, shapes and number of the vent holes included in the upper side vent hole group H5 can be suitably changed.

The lower side vent hole group H6 is provided on the lower half of the third side plate 94 that is made in a planar surface shape. The lower side vent hole group H6 includes a bottom row vent hole H61, five middle row vent holes H62 and five top row vent holes H63. The lower side vent hole group H6 is an example of "at least one vent hole" provided in the third side plate 94.

The bottom row vent hole H61 is a single vent hole provided in the bottom row of the lower side vent hole group H6. The bottom row vent hole H61 is elongated to extend in the vehicle width direction. The five middle row vent holes H62 are provided above the bottom row vent hole H61. The five middle row vent holes H62 are provided at equal intervals in the vehicle width direction. The entire width of the five middle row vent holes H62 is substantially equal to that of the bottom row vent hole H61. The five top row vent holes H63 are provided above the five middle row vent holes H62. The five top row vent holes H63 are provided at equal intervals in the vehicle width direction. The entire width of the five top row vent holes H63 is substantially equal to that of the bottom row vent hole H61. During driving of the engine 10 and after stopping of the engine 10, the air inside the engine cover 7 is released to the outside through the lower side vent hole group H6 via a vent member 30 to be described. The positions, shapes and number of the vent holes included in the lower side vent hole group H6 can be suitably changed.

In the present exemplary embodiment, regions located laterally to the lower side vent hole group H6 in the third side plate 94 are imperforate. Any other vent hole is not provided on the both sides of the lower side vent hole group H6. Additionally, a region located below the lower side vent hole group H6 in the third side plate 94 is imperforate. Any other vent hole is not provided below the lower side vent hole group H6.

The vent member 30 is disposed inside the lower side vent hole group H6. The vent member 30 is disposed to cover the vent holes H61 to H63 included in the lower side vent hole group H6 from inside. The vent member 30 covers all the vent holes provided in the lower side region among all the vent holes H4 provided in the third side plate 94 from inside.

Figure 5:
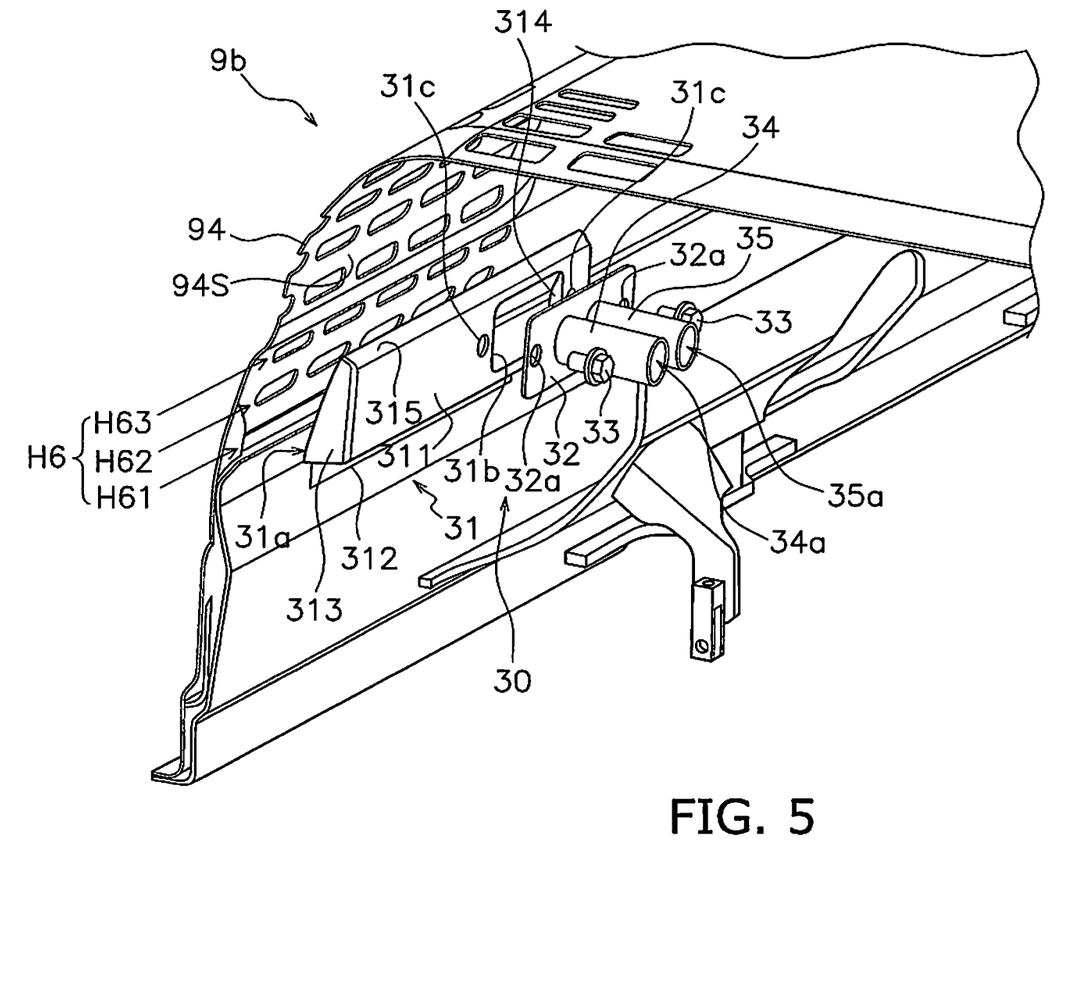
FIG. 5 is an exploded perspective diagram for explaining a construction of a ventilation member.
Figure 6:
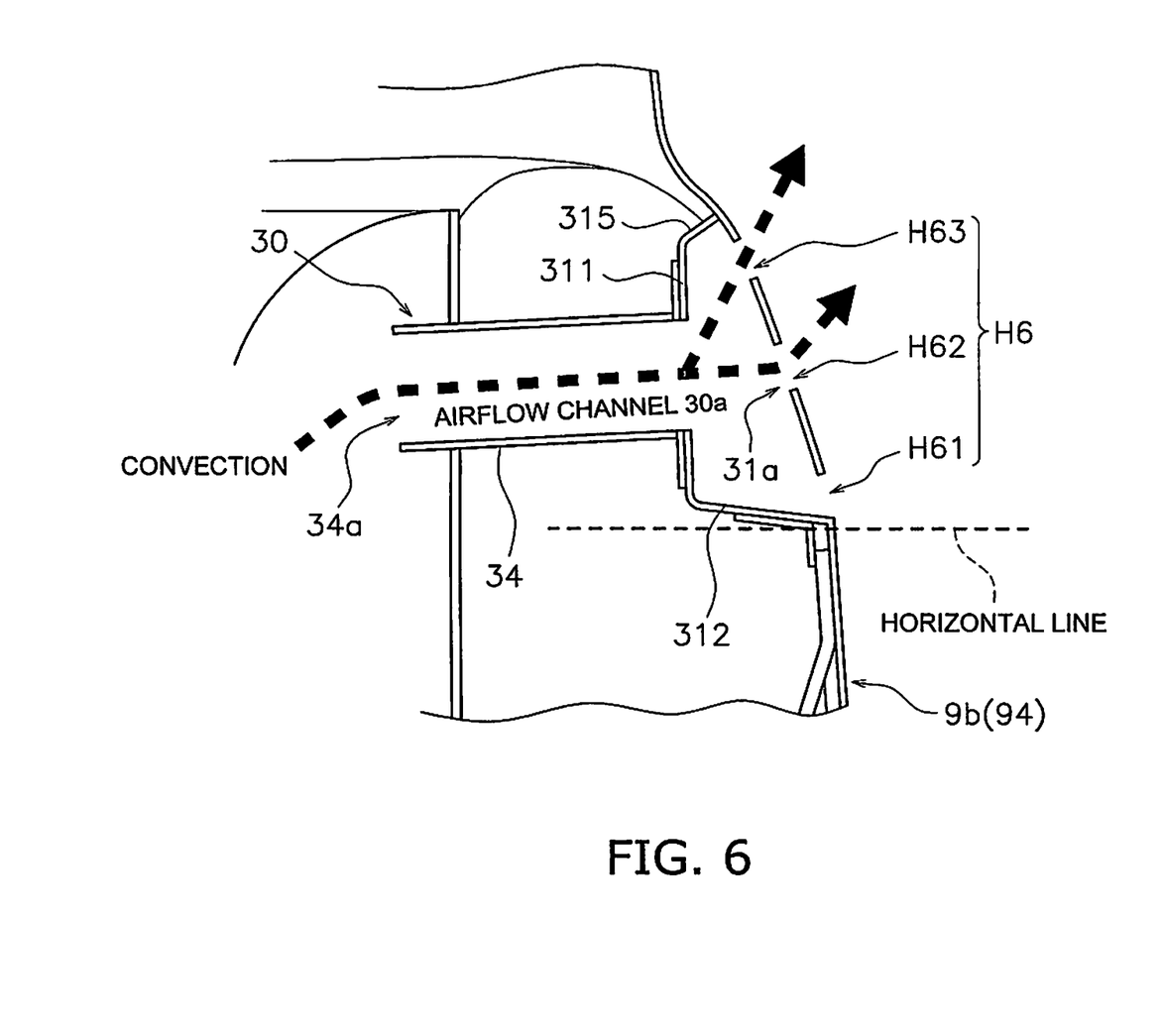
FIG. 6 is a cross-sectional diagram for explaining the construction of the ventilation member.

Now, FIG. 5 is an exploded perspective diagram for explaining a construction of the vent member 30. FIG. 6 is a cross-sectional diagram for explaining the construction of the vent member 30.

The vent member 30 is composed of an enclosure 31, a joint plate 32, two fixing tools 33, a first tube 34 and a second tube 35. The vent member 30 is entirely made in a tubular (hollow) shape. As shown in FIG. 6, an airflow channel 30a is produced in the interior of the vent member 30.

The enclosure 31 is made in the shape of a saucer with a raised edge. The enclosure 31 is elongated along the vehicle width direction. The enclosure 31 is fixed to an inner surface 94S of the third side plate 94. The enclosure 31 may be welded to the inner surface 94S of the third side plate 94, or alternatively, may be fixed thereto by unillustrated fixing tools.

The enclosure 31 includes a first opening 31a, a connecting opening 31b and two fixing holes 31c. The first opening 31a opens toward the third side plate 94. The first opening 31a is configured to be tightly attached to the inner surface 94S of the third side plate 94 when the enclosure 31 is fixed to the third side plate 94. The first opening 31a continues to the lower side vent hole group H6 provided in the third side plate 94. The first opening 31a is disposed to entirely close the vent holes H61 to H63 included in the lower side vent hole group H6 from inside. Therefore, the first opening 31a continues to all the vent holes included in the lower side vent hole group H6 such that air is capable of flowing therethrough. The air flowing to the outside through the first opening 31a is capable of flowing to the outside through all the vent holes included in the lower side vent hole group H6. The air flowing into the interior through the lower side vent hole group H6 entirely flows into the first opening 31a.

The enclosure 31 includes a vertical plate 311, a bottom plate 312, a right plate 313, a left plate 314 and a top plate 315. The vertical plate 311 is disposed away from the third side plate 94. The vertical plate 311 is provided with the connecting opening 31b and two fixing holes 31c.

The bottom plate 312 continues to the lower end of the vertical plate 311. As shown in FIG. 6, the bottom plate 312 tilts relative to the horizontal line. The bottom plate 312 downwardly tilts toward the third side plate 94. Additionally, the tip of the bottom plate 312 is disposed along the lower end of the bottom row vent hole H61 included in the lower side vent hole group H6. Therefore, when intruding into the enclosure 31 through the lower side vent hole group H6, water or dust slides down the downwardly tilting bottom plate 312 and is released to the outside through the bottom row vent hole H61. Especially in the present exemplary embodiment, as shown in FIG. 2, the lower side vent hole group H6 is configured to be oriented downward when the engine hood 9b takes the opened position. Hence, even when accumulated in the enclosure 31, water or dust is easily discharged therefrom when the engine hood 9b takes the opened position.

The right plate 313 continues to the right end of the vertical plate 311. The left plate 314 continues to the left end of the vertical plate 311. The top plate 315 continues to the upper end of the vertical plate 311. In the present exemplary embodiment, the first opening 31a of the enclosure 31 is produced by the bottom plate 312, the right plate 313, the left plate 314 and the top plate 315.

The connecting opening 31b and the two fixing holes 31c are provided in the vertical plate 311 of the enclosure 31. The connecting opening 31b has a smaller diameter than the first opening 31a. The two fixing holes 31c are provided on the both sides of the connecting opening 31b.

The joint plate 32 is disposed to close the connecting opening 31b. The first tube 34 and the second tube 35 are fixed to the joint plate 32. In the present exemplary embodiment, the first tube 34 and the second tube 35 are welded to the joint plate 32. However, the method of fixing the first and second tubes 34 and 35 to the joint plate 32 is not limited to this. The joint plate 32 is provided with the two fixing holes 32a. The two fixing holes 32a are provided on the both sides of the first and second tubes 34 and 35. The two fixing tools 33 are respectively inserted through two pairs of the fixing hole 32a of the joint plate 32 and the fixing hole 31c of the enclosure 31. Accordingly, the joint plate 32 is fixed to the enclosure 31.

The first tube 34 is fixed to the joint plate 32. The first tube 34 extends from the joint plate 32 toward the interior of the engine hood 9b. The first tube 34 includes a second opening 34a that communicates with the interior of the engine hood 9b. The second opening 34a opens toward the exhaust gas aftertreatment unit 20 (see FIG. 3). The second opening 34a is preferably disposed adjacently to the exhaust gas aftertreatment unit 20. The second opening 34a is more preferably disposed adjacently to the reducing agent injection device 24 that is especially required to be cooled among the devices composing the exhaust gas aftertreatment unit 20. As shown in FIG. 6, the first tube 34 upwardly tilts toward the engine hood 9b. Therefore, the vent member 30 also entirely upwardly tilts toward the engine hood 9b. The airflow channel 30a entirely upwardly tilts from the second opening 34a of the first tube 34 toward the first opening 31a of the enclosure 31.

The second tube 35 is fixed to the joint plate 32. The second tube 35 is disposed adjacently left of the first tube 34. The second tube 35 extends from the joint plate 32 toward the interior of the engine hood 9b. The second tube 35 includes a third opening 35a that communicates with the interior of the engine hood 9b. The third opening 35a opens toward the exhaust gas aftertreatment unit 20 (see FIG. 3). The third opening 35a is preferably disposed adjacently to the exhaust gas aftertreatment unit 20. The third opening 35a is preferably disposed adjacently to the reducing agent injection device 24 that is especially required to be cooled among the devices composing the exhaust gas aftertreatment unit 20. The second tube 35 upwardly tilts toward the engine hood 9b. Therefore, the vent member 30 also entirely upwardly tilts toward the engine hood 9b. The airflow channel 30a entirely upwardly tilts from the third opening 35a of the second tube 35 toward the first opening 31a of the enclosure 31.

The hydraulic excavator 100 includes the engine hood 9b covering the engine 10 from above and the vent member 30 disposed inside the engine hood 9b. The engine hood 9b includes the third side plate 94. The third side plate 94 is provided with the lower side vent hole group H6 (example of "at least one vent hole"), and simultaneously, regions located laterally to the lower side vent hole group H6 in the third side plate 94 are not bored. The first opening 31a of the vent member 30 continues to the inside of the lower side vent hole group H6. The second opening 34a of the vent member 30 communicates with the interior of the engine hood 9b. The vent member 30 upwardly tilts toward the engine hood 9b.

Thus, the regions located laterally to the lower side vent hole group H6 are not provided with any vent holes. A situation does not occur that hot air is released to the outside through vent holes provided in the regions located laterally to the lower side vent hole group H6. Therefore, an elevation in temperature of outdoor air can be inhibited in the surroundings of the lower side vent hole group H6. Hence, a difference in temperature between the first and second openings 31a and 34a of the vent member 30 can be enlarged. Therefore, as shown in FIG. 6, airflow (convection) directed from the second opening 34a to the first opening 31a within the vent member 30 can be generated. Due to this, high temperature air inside the engine cover 7 can be released to the outside through the lower side vent hole group H6 via the vent member 30. As a result, the interior of the engine cover 7 can be efficiently cooled even after the engine is stopped.

The region located below the lower side vent hole group H6 in the third side plate 94 of the engine hood 9b is imperforate.

Therefore, elevation in temperature of outdoor air can be more inhibited in the surroundings of the lower side vent hole group H6. Hence, the rate of airflow directed from the second opening 34a to the first opening 31a within the vent member 30 can be increased. As a result, the interior of the engine hood 9b can be more efficiently cooled.

The second opening 34a of the vent member 30 opens toward the exhaust gas aftertreatment unit 20.

Therefore, it is possible to exclusively cool the exhaust gas aftertreatment unit 20 that the temperature thereof is especially likely to become high due to radiant heat of the engine 10 and high temperature exhaust gas residing in the interior after the engine is stopped.

The vent member 30 includes the enclosure 31 provided with the first opening 31a and the tube 34 provided with the second opening 34a. The tube 34 is attached to the enclosure 31.

Therefore, spot cooling is enabled for a desired region in the interior of the engine hood 9b by suitably changing the length and position of the tube 34.

In the aforementioned exemplary embodiment, the third side plate 94 is designed to include the upper side vent hole group H5 and the lower side vent hole group H6. However, the construction of the third side plate 94 is not limited to this. The third side plate 94 may not include the upper side vent hole group H5.

In the aforementioned exemplary embodiment, the third side plate 94 is designed to include the lower side vent hole group H6, and the lower side vent hole group H6 is designed to include the bottom row vent hole H61, the five middle row vent holes H62 and the five top row vent holes H63. However, the construction of the third side plate 94 is not limited to this. The third side plate 94 is only required to include at least one vent hole.

In the aforementioned exemplary embodiment, the regions located laterally to the lower side vent hole group H6 in the third side plate 94 are designed not to be bored without being provided with any vent holes. However, vent holes may be provided therein as long as the vent holes are made in minute sizes. Specifically, vent holes may be provided in the regions located laterally to the lower side vent hole group H6 as along as the total opening area thereof is smaller than that of the lower side vent hole group H6 closed by the vent member 30 from inside. Even in this construction, impact on elevation in temperature of the outdoor air in the surroundings of the lower side vent hole group H6 is slight. Hence, the interior of the engine hood 9b can be efficiently cooled after the engine is stopped. Thus, in the present specification, a construction provided with minute vent holes that do not substantially impose an impact on cooling of the interior of the engine hood 9b should be understood as being encompassed in the concept "regions located laterally to the lower side vent hole group H6 are imperforate".

In the aforementioned exemplary embodiment, the region located below the lower side vent hole group H6 in the third side plate 94 is designed not to be bored without being provided with any vent hole. However, vent holes may be provided therein as long as the vent holes are made in minute sizes. Specifically, vent holes may be provided in the region located below the lower side vent hole group H6 as along as the total opening area thereof is smaller than that of the lower side vent hole group H6 closed by the vent member 30 from inside. Even in this construction, impact on elevation in temperature of the outdoor air in the surroundings of the lower side vent hole group H6 is slight. Hence, the interior of the engine hood 9b can be efficiently cooled after the engine is stopped. Thus, in the present specification, a construction provided with minute vent holes that do not substantially impose an impact on cooling of the interior of the engine hood 9b should be understood as being encompassed in the concept "a region located below the lower side vent hole group H6 is imperforate".

In the aforementioned exemplary embodiment, the vent member 30 is designed to be attached to the third side plate 94. However, the positional arrangement of the vent member 30 is not limited to this. The vent member 30 is configured to achieve the aforementioned advantageous effects when being attached to the side plate provided with vent holes. Hence, advantageous effects similar to those described above can be achieved, for instance, when the vent member 30 is disposed inside the vent holes H3 provided in the first side plate 92.

In the aforementioned exemplary embodiment, the single bottom row vent hole H61 extending in the vehicle width direction is designed to be disposed in the bottom row of the lower side vent hole group H6. However, the construction of the bottom row vent hole H61 is not limited to this. The bottom row vent hole H61 may be divided into a plurality of vent holes.

In the aforementioned exemplary embodiment, the vent member 30 is designed to include the first tube 34 and the second tube 35. However, the vent member 30 may include only either of the first tube 34 and the second tube 35. Additionally, the first tube 34 and the second tube 35 are designed to be identically constructed. However, the first tube 34 and the second tube 35 may be differently constructed. For example, spot cooling is enabled for different regions in the interior of the engine hood 9b by changing the length and positional arrangement of the first tube 34 and those of the second tube 35.

In the aforementioned exemplary embodiment, the vent member 30 is designed to be composed of the enclosure 31, the joint plate 32, the first tube 34 and the second tube 35. However, the construction of the vent member 30 is not limited to this. The vent member 30 may be composed of only the enclosure 31. In this construction, the connecting opening 31b of the enclosure 31 functions as the "second opening". Additionally, the shape and size of the enclosure 31 can be suitably changed. Alternatively, the vent member 30 may be composed of only the first tube 34. In this case, the opposite opening to the second opening 34a functions as "second opening". In the constructions herein mentioned, the shape and size of the enclosure 31 and those of the first tube 34 can be suitably changed.

In the aforementioned exemplary embodiment, the vent member 30 is designed to include the first tube 34 and the second tube 35. However, the construction of the vent member 30 is not limited to this. The vent member 30 may include only either of the first tube 34 and the second tube 35. Alternatively, the vent member 30 may further include one or more other tubes in addition to the first tube 34 and the second tube 35.

In the aforementioned exemplary embodiment, the exhaust gas aftertreatment unit 20 is designed to include the diesel particulate filter device 21. However, the construction of the exhaust gas aftertreatment unit 20 is not limited to this. The exhaust gas aftertreatment unit 20 may include a diesel oxidation catalyst (DOC) instead of the diesel particulate filter device 21. The diesel oxidation catalyst has a function of increasing nitrogen dioxide ($NO_2$) by reducing nitrogen monoxide (NO) among nitrogen oxides (NOx) contained in the exhaust gas.

In the aforementioned exemplary embodiment, the vent member 30 is designed to be disposed inside the third side plate 94 of the engine hood 9b in order to efficiently cool the interior of the engine cover 7. However, the positional arrangement of the vent member 30 is not limited to this. The vent member 30 is only required to be disposed inside the side plates of the engine cover 7. Hence, the vent member 30 may be disposed inside the lateral cover 9a of the engine cover 7. In the present exemplary embodiment, each of the lateral cover 9a and the third side plate 94 of the engine hood 9b is an example of "a side plate of an engine cover".

In the aforementioned exemplary embodiment, each of the first tube 34 and the second tube 35 is designed to have a circular cross section. However, each of the first tube 34 and the second tube 35 may have a rectangular cross section, a polygonal cross section, an elliptic cross-section and so forth.

The invention claimed is:

1. A work vehicle, comprising:
an engine;
an engine cover configured to enclose the engine; and
a vent member disposed inside the engine cover,
the engine cover including a side plate provided with at least one vent hole,
a region located laterally to the at least one vent hole in the side plate being imperforate,
the vent member including an enclosure and a tube, the enclosure being provided with a first opening and a connecting opening, the first opening being attached to an inner surface of the side plate and enclosing the at least one vent hole, the connecting opening being spaced from the first opening toward an interior of the engine cover, the tube being attached to the connecting opening of the enclosure and having a second opening that is spaced from the connecting opening toward the interior of the engine cover and communicates with the interior of the engine cover, the connecting opening at least partially overlapping the at least one vent hole in a side direction of the work vehicle, and the vent member upwardly tilting toward the engine cover.

2. The work vehicle recited in claim 1, wherein a region located below the at least one vent hole in the side plate is imperforate.

3. The work vehicle recited in claim 2, further comprising an exhaust gas aftertreatment unit disposed inside the engine cover,
the second opening opening toward the exhaust gas aftertreatment unit.

4. The work vehicle recited in claim 1, further comprising an exhaust gas aftertreatment unit disposed inside the engine cover, the second opening opening toward the exhaust gas aftertreatment unit.

5. The work vehicle recited in claim 1, wherein,
the enclosure includes a bottom plate arranged and configured to downwardly tilt toward the inner surface of the side plate when the engine cover is closed and the work vehicle is on a horizontal surface, an edge of the bottom plate forming a portion of the first opening disposed along a lower edge of the at least one vent hole, such that water or dust slides down the downwardly tilted bottom plate and is released to the outside.

* * * * *